July 25, 1967     K. C. WILSON     3,332,243
LIGHTWEIGHT ISENTROPIC SPIKE NOZZLE
Filed Dec. 29, 1964
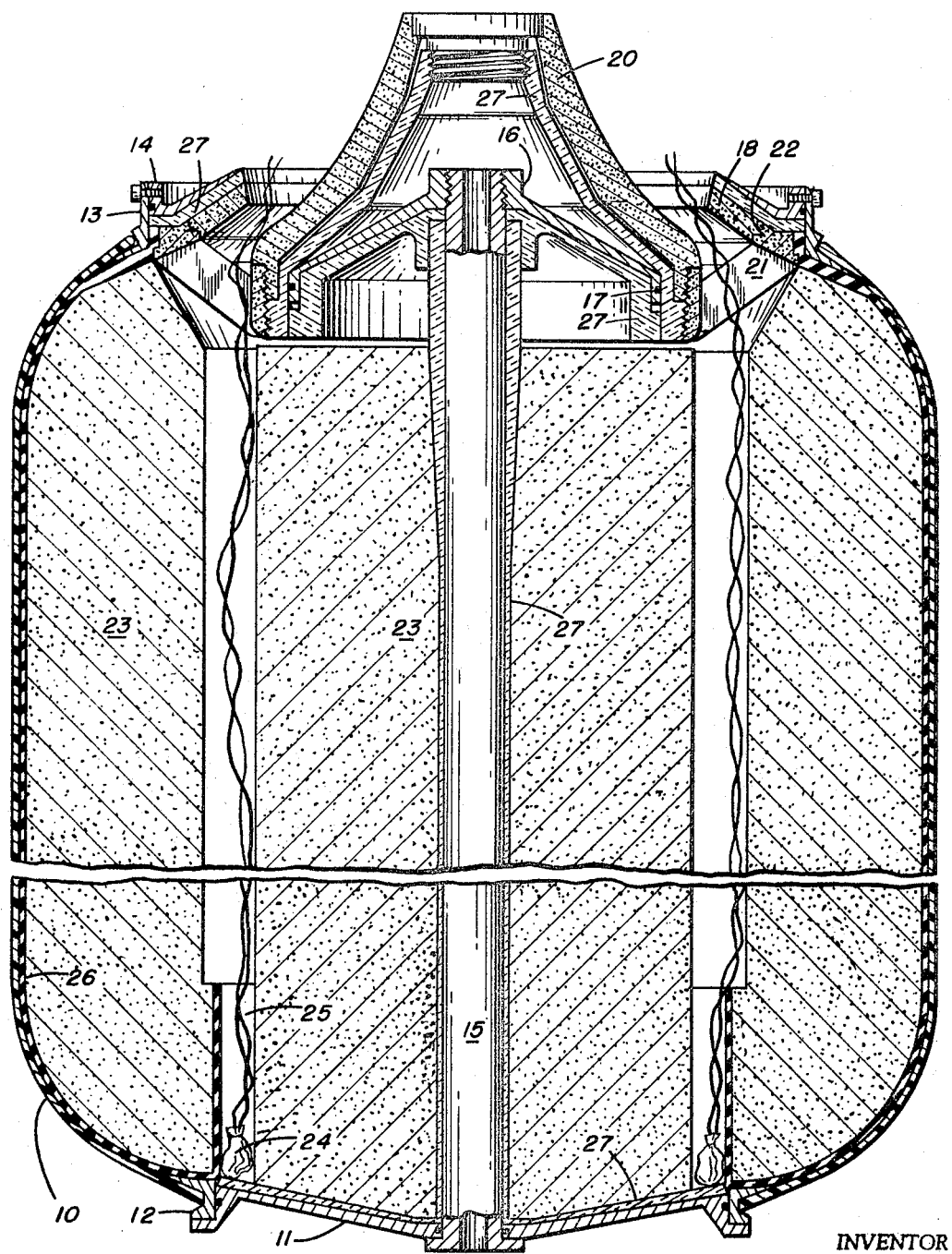
INVENTOR
KENNETH C. WILSON
BY
*Claude Funkhouser*
ATTORNEY
*Richard D. Graver*
AGENT

United States Patent Office 3,332,243
Patented July 25, 1967

3,332,243
LIGHTWEIGHT ISENTROPIC SPIKE NOZZLE
Kenneth C. Wilson, Cumberland, Md., assignor, by mesne assignments, to the United States of America as represented by the Secretary of the Navy
Filed Dec. 29, 1964, Ser. No. 423,645
3 Claims. (Cl. 60—271)

This invention relates generally to spike nozzles for rocket motors and, more particularly, to means for maintaining a desired nozzle throat area during firing of the motor.

In solid propellant rocket motors, the magnitude of the thrust developed is basically dependent upon ambient temperature and pressure, area of the propellant burning surface, and the throat area of the exhaust nozzle. More particularly, thrust is inversely proportional to nozzle throat area. Since the trajectory of a rocket motor powered vehicle is a function of both the magnitude and the direction of the thrust generated by the motor, it is desirable to eliminate as many extraneous thrust varying factors as possible in order to maintain more nearly complete control over the vehicle trajectory.

In a spike type of nozzle, one of the factors that induces changes in nozzle throat area is thermal expansion. The nozzle cowl and spike are often independently mounted to different portions of the motor casing. Since their respective supporting structures may be made of different materials, of different lengths, and subjected to different temperatures, the effect of thermally induced expansion or contraction is to create relative movement between the spike and cowl portions of the nozzle. This relative movement results in undesirable variations in nozzle throat area.

Relative movement between the spike and cowl may also result from the force of pressurized exhaust gas acting upon the surface of the spike. In order to resist these high exhaust gas forces, it has been necessary in the past to provide relatively massive supporting structure for the spike. The introduction of this additional dead weight to the rocket motor structure has the obvious disadvantage of reducing the velocity and range of a rocket powered vehicle.

Accordingly, it is an object of this invention to provide a rocket motor, of the spike exhaust nozzle type, that remains constant in nozzle throat area during firing of the rocket.

It is a further object of this invention to provide a spike nozzle for a rocket motor which resists the tendency of thermal expansion and pressurized exhaust gas forces to vary the area of the nozzle throat.

It is another object of this invention to provide a rocket motor spike nozzle which remains constant in throat area during firing of the rocket yet is light in weight.

It is a further object of this invention to provide a rocket motor with an isentropic spike nozzle wherein the exhaust gas forces acting upon the nozzle are balanced.

Other objects, advantages and novel features of the invention will become apparent from the following detailed description of the invention when considered in conjunction with the accompanying drawings, wherein:

The figure is a longitudinal section taken through a solid propellant rocket motor which incorporates a preferred embodiment of the lightweight isentropic spike nozzle of this invention.

Referring now to the drawing there is illustrated a substantially cylindrical rocket motor casing 10. Casing 10 may be made of any suitable material such as steel or a filament wound epoxy glass fiber. Closing the port in the forward end (the lower end as viewed in the figure) of casing 10 is forward head cap 11. Rings 12, 13, and 14 are preferably made of metal and serve to provide additional strength and to maintain dimensional stability of the openings at the forward and rearward ends of the casing. A tube 15 passing along the longitudinal axis of casing 10 is anchored in forward head cap 11 and serves to support a pressure plate 16 which is rigidly attached to the rearward end of tube 15. Tube 15 also serves to vent the inside of spike 20 to ambient conditions. Partially closing a port at the rearward end of motor casing 10 is nozzle cowl 18. The truncated isentropic spike 20 is concentrically located along the longitudinal axis of casing 10 and is rigidly supported with respect to nozzle cowl 18 by a spike spacer 21. Spacer 21, which may be connected to cowl 18 by threads 22, comprises a spider configuration which bridges the annular nozzle throat.

The rocket motor illustrated utilizes a solid propellant 23 distributed inside casing 10 in two concentric annular portions. Propellant 23 may be ignited by igniters 24 which are connected to ignition controls (not shown) by lead wires 25.

The inner surface of casing 10 may be lined with an insulating material 26 which serves to protect the casing from the burning propellant and which further serves as an aid in bonding the solid propellant to the motor casing. Similarly, insulating material 27 is employed on the inner surface of forward head cap 11, on the outer surface of tube 15, between cowl 18 and ring 14, and on the forward surfaces of pressure plate 16 and spike 20. The forward surface of pressure plate 16 is subjected to very high gas pressure forces during the firing of the rocket, and it is therefore extremely important that it be protected by this insulation from the high exhaust gas temperatures in order that it may maintain its structural integrity.

In accordance with the aforementioned object of providing a lightweight spike nozzle, this invention provides a unique structural relationship between pressure plate 16 and spike 20. Pressure plate 16 is freely slideable inside of spike 20. Insulation 27 on the forward surface of pressure plate 16 acts as a gasket between pressure plate 16 and spike 20, and thus prevents the entrance of heat from the propellant gases into the space therebetween. This prevents the heat from attacking the O ring pressure seal 17, on the pressure plate 16, which seals the high pressure gases from entering the inner portion of the spike. This novel spike construction permits relative movement between pressure plate 16 and spike 20, yet provides a continuous barrier to exhaust gas under pressure which would otherwise act upon the forward surface of spike 20.

Pressure plate 16 does not prevent exhaust gas under pressure from acting on the forward surfaces of spacer 21 or upon the forward lip of spike 20. However, spike 20 and spacer 21 are mutually disposed and configured in such a way that these rearwardly acting forces are substantially balanced by the forwardly directed force of the exhaust gas which is expanding over the outer surface of spike 20 and which acts upon the rearward surfaces of spike 20 and spacer 21.

The balanced forces resulting from this novel spike construction permit a substantial reduction in the weight of the spike supporting structure.

The spike spacer 21 and cowl 18 are preferably fabricated from the same material in order to minimize stresses resulting from unequal thermal expansion rates. One lightweight material which has functioned successfully for this purpose is graphite.

The mutual relationship of this unique spike and cowl permits the spike to move longitudinally on the pressure plate assembly at the same rate as the cowl, thus eliminating the effect of differences in thermally induced linear changes between casing 10 and tube 15. By this construction the lightweight isentropic spike maintains a desired nozzle throat area throughout a firing of the rocket.

Although a spike nozzle of the isentropic type is illustrated and described herein, it is to be understood that any type of tapered spike nozzle could utilize the teaching of this invention.

Obviously many modifications and variations of the present invention are possible in the light of the above teachings. It is therefore to be understood that within the scope of the appended claims the invention may be practiced otherwise than as specifically described.

What is claimed is:

1. A rocket motor comprising:
   motor casing means defining a propellant chamber;
   cowl means mounted on the rearward end of said motor casing;
   spike means mounted on said cowl means;
   an inner surface of said cowl means defining the outer boundary, and a portion of said spike means defining the inner boundary, of an annular exhaust passage; and
   pressure plate means connected to said motor casing and positioned inside the forward part of said spike means so as to isolate substantially all of the forward surface of said spike means from the force of exhaust gas pressure, said spike having an inner portion which is slidably mounted on said pressure plate means.

2. A rocket motor as in claim 1 wherein said spike means and said cowl means are made from materials having the same coefficient of thermal expansion.

3. A rocket motor as in claim 1 wherein the spike means and pressure plate means are mutually configured and disposed so that the pressure of exhaust gas acting on the forward surface of the spike means will be substantially balanced by the pressure of exhaust gas expanding over the rearward surface of said spike means.

References Cited

UNITED STATES PATENTS 3,214,906   11/1965   Coleal _____ 60—35.6

CARLTON R. CROYLE, *Primary Examiner.*

SAMUEL FEINBERG, *Examiner.*